No. 771,261. PATENTED OCT. 4, 1904.
C. MONIN.
VARIABLE SPEED TRANSMISSION GEAR.
APPLICATION FILED DEC. 8, 1903.
NO MODEL.
FIG.1. FIG.2.
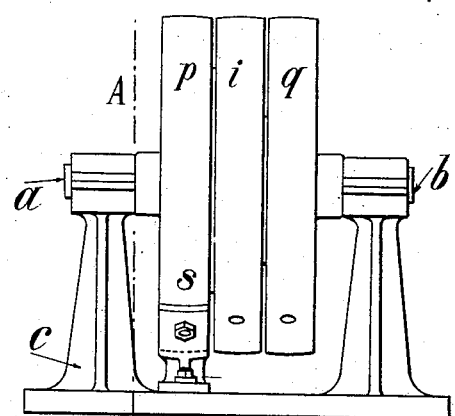
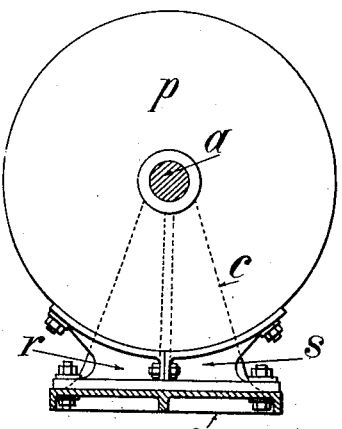
FIG.3. FIG.4.
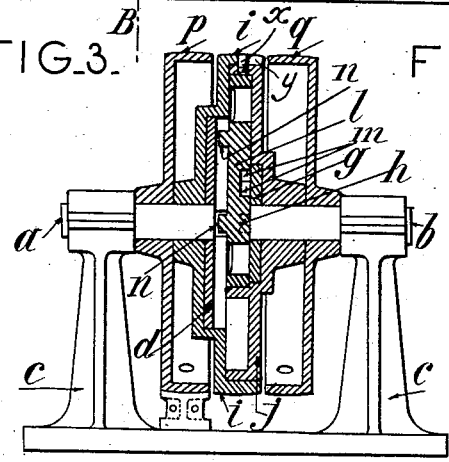
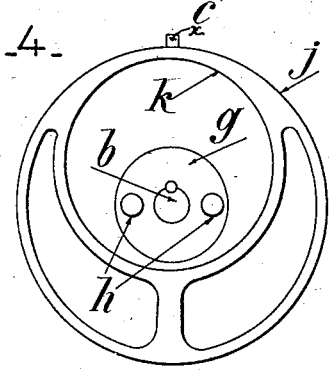
FIG.5. FIG.6.
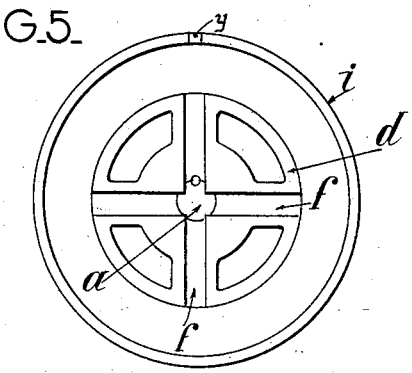
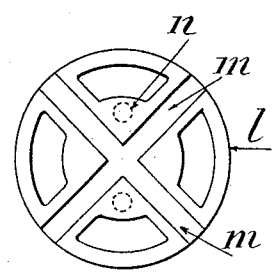
WITNESSES
H. M. Kuehne
John A. Percival
INVENTOR
Charles Monin
BY Richardson
ATTORNEYS No. 771,261. Patented October 4, 1904.

UNITED STATES PATENT OFFICE.

CHARLES MONIN, OF LE MANS, FRANCE.

VARIABLE-SPEED-TRANSMISSION GEAR.

SPECIFICATION forming part of Letters Patent No. 771,261, dated October 4, 1904.

Application filed December 8, 1903. Serial No. 184,337. (No model.)

*To all whom it may concern:*

Be it known that I, CHARLES MONIN, civil engineer, a citizen of the French Republic, and a resident of 161 Avenue de la République, Le Mans, Sarthe, in the Republic of France, have invented certain new and useful Improvements in Variable-Speed-Transmission Gear, of which the following is a specification.

My invention relates to a variable-speed-transmission gear allowing of transmitting motion for two rotary shafts at the usual ratios and remarkable for the simplicity of its construction and the small space that it occupies, all the parts being besides protected by the construction of the device.

It is known that when a circumference of a given diameter rolls in another circumference of double that diameter any given point of the former describes one diameter of the latter, this diameter being a particular form of hypocycloid. It is also known that if instead of making the first circumference roll it is caused to turn on its center, rendered stationary, so as to drive along the large circumference, the center of which is also supposed to be stationary, any given point of the first circumference will slide along the radius of the second circumference, and the latter will turn with an angular velocity equal to half that of the small circumference, so that there will result a reduction of speed at the ratio of two to one between the axle of the first circumference and that of the second. Starting from this principle, I have constructed the variable-speed-transmission gear illustrated in the accompanying drawings.

Figure 1 is an exterior view in elevation. Fig. 2 is a section on the line A B of Fig. 1. Fig. 3 is a vertical section of the mechanism. Figs. 4, 5, and 6 are detail views of the principal parts of the mechanism.

The mechanism comprises two shaft-sections *a* and *b* in alinement with each other, journaled, respectively, in parallel bearings of a frame *c*. These two shafts carry keyed on their adjacent ends, the one a plate *d*, provided with two diametrical grooves crossing each other at right angles, and the other a plate *g*, provided with two pins *h*, arranged at the ends of a diameter. On these shafts are loosely mounted two cup-shaped plates *i* and *j*, which fit one inside the other. The wheels *i* and *j* are connected to each other by means of a pin *x*, which is fixed to the wheel *j*. When the wheels are mounted together, the pin *x* is inserted sidewise through the slot *y*, provided for it in the wheel *i*. In a recess of the plate *i* fits snugly the plate *d*, so as to rotate freely, though being guided, and in a recess of the plate *j* fits in the same manner the plate *g*. The cup-shaped plate *j* is provided with a second cylindrical eccentric recess *k*, in which fits snugly a disk *l*, free to rotate and having on one side diametrical grooves *m*, crossing each other at right angles, and on the other side pins *n*, arranged on the same diameter. The pins *h* of the plate *g* engage into the grooves of the disk *l* and the pins *n* of said disk *l* engage into the grooves of the plate *d*. The center of the eccentric disk *l* is on the circumference described by the pins *h* of the plate *g*, and the distance between the pins *n* of the disk is equal to the distance between the pins *h*. The disk *l* and the plate *d* have the same diameter, which is double that of the plate *g*. Under these conditions if the shaft *b* is revolved the plate *g*, keyed on said shaft, drives along by means of its pins *h* the disk *l*, which revolves on its axis at a speed half that of the shaft *b*. At the same time the disk *l* drives by means of its pins *n* the plate *d*, which revolves on its axis at a speed half that of the disk—that is to say, equal to one-fourth of that of the shaft *b*. Thus the shaft *a* revolves at a speed four times smaller than that of the shaft *b*. On the shafts *a* and *b* are also keyed, respectively, two pulleys *p* and *q*, the diameters of which are the same and equal to that of the cup-shaped plate *i*. These pulleys are also cup-shaped and have their full bottom turned outward. The plate *i* can itself serve as pulley.

Each of the three pulleys has on its periphery two holes adapted to receive bolts or screws, and two blocks *r* and *s*, which can be fixed simultaneously on any one of the pulleys and on the frame *c*, allow of rendering stationary at will one of the pulleys *p*, *i*, or *q*. Two belts are placed on the two other pulleys and are connected to the shafts to which the various speeds are to be transmitted. This arrangement allows of obtaining the three following modifications of speed: If the pulley $p$ is fixed as shown in the drawings and if one of the other two pulleys is rotated, these pulleys $i$ and $q$ revolve in opposite directions, and while the pulley $i$ makes one revolution in one direction the pulley $q$ makes three revolutions in the opposite direction. If, on the other hand, the fixing-blocks are applied to the pulley $i$ and if the belts are placed on the two other pulleys, these pulleys $p$ and $q$ will revolve in the same direction, and while the pulley $p$ makes one revolution the pulley $q$ will make four revolutions, and vice versa. Finally, if the pulley $q$ is fixed and the belts are placed on the pulleys $p$ and $i$ these pulleys will revolve in the same direction, and while the pulley $i$ makes one revolution the pulley $p$ will make three-quarters of a revolution.

Having now described my invention, what I claim as new, and desire to secure by Letters Patent, is—

1. A variable-speed-transmission gear comprising a shaft $a$ and a shaft $b$ in alinement with each other, a plate $d$ keyed on the shaft $a$, and having diametrical cross-grooves $f$, a plate $g$ keyed on shaft $b$, pins $h$ arranged at the ends of a diameter of said plate, an eccentric disk $l$ having its center on the circumference described by the pins $h$, and having two cross-grooves $m$ arranged on one side thereof and into which engage pins $h$, two pins $n$ fixed on the other side of the disk $l$ and on a diameter equal to the distance between the pins $h$, said pins $n$ engaging into grooves of the plate $d$, and means for maintaining stationary the center of the eccentric disk, substantially as and for the purpose set forth.

2. A variable-speed-transmission gear comprising a shaft $a$ and a shaft $b$ in alinement with each other, a plate $d$ keyed on the shaft $a$, and having diametrical cross-grooves $f$, a plate $g$ keyed on shaft $b$, pins $h$ arranged at the ends of a diameter of said plate, an eccentric disk $l$ having its center on the circumference described by the pins $h$, and having two cross-grooves $m$ arranged on one side thereof and into which engage pins $h$, two pins $n$ fixed on the other side of the disk $l$ and on a diameter equal to the distance between the pins $h$, said pins $n$ engaging into the grooves of the plate $d$, a cup-shaped plate $i$ loosely mounted on the shaft $a$ and provided with a recess in which is located and revolves the plate $d$, a second cup-shaped plate $j$ which fits into the first one, said plate $j$ having a cylindrical recess in the center thereof and in which is located and revolves the plate $g$, and a second cylindrical recess eccentrically located therein in which is located and revolves the disk $l$ and means for fixing together the two cup-shaped plates on their periphery, substantially as and for the purpose set forth.

3. A variable-speed-transmission gear comprising a shaft $a$ and a shaft $b$ in alinement with each other, a plate $d$ keyed on the shaft $a$, and having diametrical cross-grooves $f$, a plate $g$ keyed on shaft $b$, pins $h$ arranged at the ends of a diameter of said plate, an eccentric disk $l$ having its center on the circumference described by the pins $h$, said disk having two cross-grooves $m$ arranged on one side thereof and into which engage pins $h$, two pins $n$ fixed on the other side of the disk $l$ and on a diameter equal to the distance between the pins $h$, said pins $n$ engaging into the grooves of the plate $d$, a cup-shaped plate $i$ loosely mounted on the shaft $a$ and provided with a recess in which is located and revolves the plate $d$, a second cup-shaped plate $j$ which fits into the first one, said plate $j$ having a cylindrical recess provided in the center thereof and in which is located and revolves the plate $g$, and a second cylindrical recess eccentrically located therein in which is located and revolves the disk $l$, the two cup-shaped plates being secured together on their peripheries, a pulley $p$ keyed on the shaft $a$, a pulley $q$ keyed on the shaft $b$, a frame $c$ supporting the rotary shafts $a$ and $b$, two blocks $r$ and $s$, and means for fixing these blocks simultaneously on the frame and on one of the pulleys $p$, $i$, or $q$, substantially as and for the purpose set forth.

In witness whereof I have hereunto set my hand in presence of two witnesses.

CHARLES MONIN.

Witnesses:
ANTOINE LAVOIX,
HANSON C. COXCE.